United States Patent [19]
Kristensen

[11] Patent Number: 5,722,312
[45] Date of Patent: Mar. 3, 1998

[54] PROCESS FOR MOUNTING A CYLINDER SLEEVE IN A BASE MEMBER, AND A HYDRAULIC MACHINE

[75] Inventor: Egon Kristensen, Nordborg, Denmark

[73] Assignee: Danfoss A/S, Nordborg, Denmark

[21] Appl. No.: 464,684

[22] PCT Filed: Dec. 22, 1993

[86] PCT No.: PCT/DK93/00439

§ 371 Date: Jun. 27, 1996

§ 102(e) Date: Jun. 27, 1996

[87] PCT Pub. No.: WO94/15757

PCT Pub. Date: Jul. 21, 1994

[30] Foreign Application Priority Data

Jan. 18, 1993 [DE] Germany .................. 43 01 124.1

[51] Int. Cl.$^6$ ............................................. F01B 11/02
[52] U.S. Cl. ............................................. 92/171.1; 29/523
[58] Field of Search ............................. 92/169.1, 171.1; 29/522.1, 523, 510, 512, DIG. 43

[56] References Cited

U.S. PATENT DOCUMENTS

| | | | |
|---|---|---|---|
| 325,692 | 9/1885 | Parker | 29/DIG. 43 X |
| 1,587,967 | 6/1926 | Limont | 29/DIG. 43 X |
| 1,696,229 | 12/1928 | Fantz | 29/DIG. 43 X |
| 5,083,363 | 1/1992 | Ransom et al. | 29/523 |
| 5,496,656 | 3/1996 | Waggoner | 29/523 X |

FOREIGN PATENT DOCUMENTS

| | | | |
|---|---|---|---|
| 512299 | 4/1955 | Canada | 29/523 |
| 2021236 | 11/1979 | United Kingdom | 92/171.1 |

*Primary Examiner*—Hoang Nguyen
*Attorney, Agent, or Firm*—Lee, Mann, Smith, McWilliams, Sweeney & Ohlson

[57] ABSTRACT

A method for mounting a cylinder sleeve in a base member is disclosed, in which the cylinder sleeve is inserted in the base member and the outer diameter of the inserted cylinder sleeve is enlarged at one end, and a hydraulic machine with a base member in which at least one cylinder sleeve is arranged in a cylinder bore. In this connection, it is desirable to be able to use materials for the cylinder sleeve that could not previously be satisfactorily fixed in the base member. For that purpose, the cylinder sleeve is heated before the outer diameter is enlarged. The cylinder bore has at at least one end a gradual enlargement of diameter and the cylinder sleeve has an enlargement of its outer diameter matched to this enlargement of diameter.

16 Claims, 1 Drawing Sheet

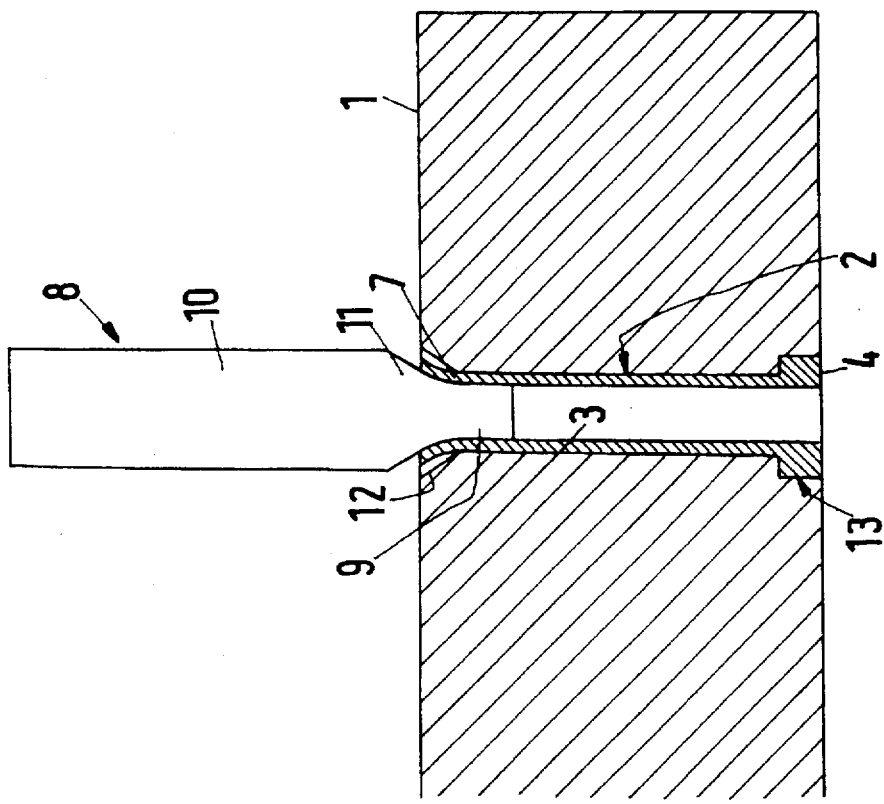
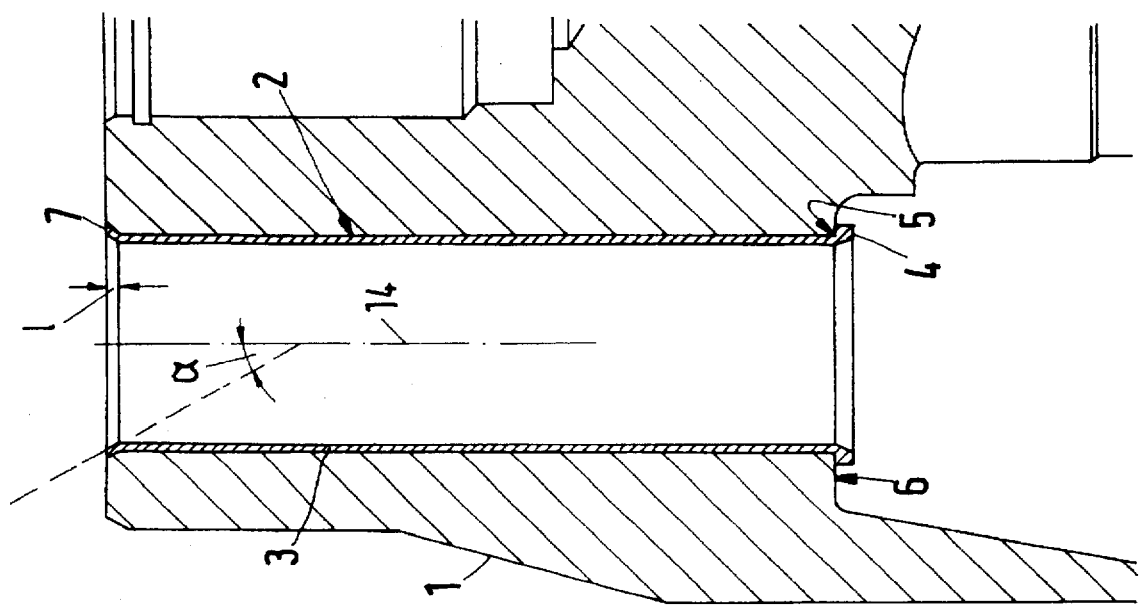

PROCESS FOR MOUNTING A CYLINDER SLEEVE IN A BASE MEMBER, AND A HYDRAULIC MACHINE

BACKGROUND OF THE INVENTION

The invention relates to a process for mounting a cylinder sleeve in a base member, in which the cylinder sleeve is inserted in the base member and the outer diameter of the inserted cylinder sleeve is enlarged at one end, and to a hydraulic machine with a base member in which at least one cylinder sleeve is arranged in a cylinder bore.

Hydraulic machines which convert pressure and movement into one another by means of pistons moving back and forth in cylinders have long been known. In order to keep the wear and tear in such machines to a minimum, it is usual to let the pistons run not directly in bores formed in the base member, but to insert in the base member cylinder sleeves or bushings in which the pistons can move. In this manner, it is possible to use suitable combinations of material for the piston and cylinder sleeve without having to make the entire base member from the generally more expensive material of the cylinder sleeve. The material of the base member can then be selected to take into account other side constraints, such as strength.

The problem of having to match cylinder sleeves or bushings to the pistons is also found with other hydraulic elements and devices, for example, in hydraulic valves.

To be able to fix cylinder sleeves in the base member, it is known (DE-AS 12 67 985) to fix the cylinder sleeve first of all by means of a press fit in a cylinder bore in the base member. Here, the cylinder sleeve has a collar which is pressed into an annular groove of substantially rectangular cross-section in the inner wall of the cylinder bore. To produce the collar, the cylinder sleeve has at one end an enlargement of its material which projects inwards. After pressing the cylinder sleeve into the cylinder bore, a mandrel is pressed into the liner so that the collar is expanded, with the result that the collar engaging in the annular groove is formed on the outside of the cylinder sleeve.

The prerequisite for such a procedure is that the material of the cylinder sleeves allows such a deformation without the cylinder sleeve being damaged. This is generally the case only with metals. But even with metals, this procedure can lead to embrittlement with the consequences of premature wear or even failure of the machine. A number of materials which, together with the material of the piston, have inherently suitable running properties for the application therefore have to be ruled out because a reliable mounting of the cylinder sleeve in the base member cannot be guaranteed.

SUMMARY OF THE INVENTION

The problem underlying the invention is therefore to enable cylinder sleeves made of other materials to be mounted also.

This problem is solved in a method of the kind mentioned in the introduction in that the cylinder sleeve is heated before its outer diameter is enlarged.

Heating the liner means that in many cases the material is more readily deformable. Embrittlement, such as occurs in many cases in the known cold-forming method, can in this case be reliably counteracted. Cylinder sleeves of materials that are not deformable in the cold state but would break, can now be expanded by such a heating process. This is the case in particular with many plastics materials. The mounting method according to the invention now enables material combinations of piston and cylinder sleeve to be used that work satisfactorily even when the hydraulic fluid has only a reduced lubricating capacity.

Preferably, the cylinder sleeve is heated only at the end to be expanded. This saves energy. Moreover, the material structure is affected by the temperature increase only at the end to be expanded. The cylinder sleeve remains otherwise unchanged. Faults such as those that could occur in the material structure of the cylinder sleeve as a result of a temporary temperature increase are thereby largely avoided. In the region of the end to be expanded, on the other hand, such a change does not matter since processing or deformation is effected here anyway by the expansion.

The cylinder sleeve is preferably expanded at its end such that its inner diameter is increased to beyond the inner diameter in the remaining region. This is not a deformation in which, for example, a proportion of material has to be displaced elsewhere, but merely a dilatation of the liner at the end to be expanded. Particularly when combined with the preceding temperature increase, such a dilating process can be carried out in many cases without problems.

For that purpose, a heated tool is advantageously introduced under pressure into the end of the cylinder sleeve to be expanded, and simultaneously exerts axial and radial forces on the cylinder sleeve. At the same time as the heat transfer is being effected, however, those forces that are required to expand the cylinder sleeve at its end are also being exerted on the cylinder sleeve. Because axial and radial forces are being transmitted to the cylinder sleeve simultaneously, it is relatively easy to ensure that the cylinder sleeve is secured in the base member without axial play.

For that purpose, the tool preferably has a first portion corresponding to the inner diameter of the cylinder sleeve and a second portion of larger diameter, the transition from the first to the second portion being substantially in the form of a portion of a conical surface. The expansion is therefore cone-shaped. The first portion of the tool serves for guidance. The forces that are required to expand the cylinder sleeve are applied in the region of the transition. Pressure of the conical surface on the end of the cylinder sleeve produces axial and radial forces simultaneously, which expand the cylinder sleeve at its end and at the same time cause it to engage securely in the base member.

The cylinder sleeve is preferably heated to a temperature below its melting point and above a value at which its material deforms plastically, at least in places. Limiting the temperature to a value below the melting point ensures that the cylinder sleeve does not flow away. The material at the end of the cylinder sleeve therefore remains in place, without further precautions having to be taken. On the other hand, the heating process ensures that the material becomes plastically deformable, so that once the deformation has occurred the resulting state is retained.

The other end of the cylinder sleeve is also preferably pre-formed before insertion into the base member. For example, a circumferential projection which engages with the base member can be moulded on the cylinder sleeve. This projection is able to accommodate axial pressure forces at this end. When the non-preformed end is then expanded, the cylinder sleeve sits securely and fixedly in the base member.

It is an advantage here if, before insertion of the cylinder sleeve, the base member is shaped to correspond with the other end. This can be effected, for example, in that the cylinder bore at this end has a corresponding enlargement of diameter into which the pre-formed end of the cylinder sleeve can be inserted. The cylinder sleeve can then also be secured at the same time in the radial direction.

It is especially preferred for the end face of the base member receiving the other end of the cylinder sleeve and that end of the cylinder sleeve to be brought into one plane. Cylinder sleeve and base member then end in one face. This can be brought about during manufacture in that the axial extent of the projection of the cylinder sleeve and the depth of the shaping in the base member correspond to one another. If desired, additional subsequent machining can be effected by grinding or other processing steps.

In another preferred construction, provision is made for the cylinder sleeve to be expanded at both ends. A pre-formed shaping of the cylinder sleeve is not necessary in that case. Expansion of the cylinder sleeve at both ends can be effected simultaneously, which has the advantage that additional fixing of the cylinder sleeve in the base member can be omitted.

In a hydraulic machine of the kind mentioned in the introduction, the problem is solved in that the cylinder bore has a gradual enlargement of diameter at at least one end, and the cylinder sleeve has an enlargement of its outer diameter matched to this enlargement of diameter.

The gradual enlargement of diameter of the cylinder bore has the advantage that material of the cylinder sleeve is widened at its end with a relatively gentle transition, so that a gradual dilatation of the cylinder sleeve towards its end can be effected. The danger of cracks forming is largely eliminated by this means. More comprehensive deformation work, of the kind that has to be performed in known cases, where material of the cylinder sleeve actually has to be shifted from the inside to the outside, is unnecessary. The term "machine" shall be understood here in its broadest sense. It includes, therefore, not only devices for energy conversion, such as pumps and motors, but also control elements, such as valves, in which a sliding member in the cylinder sleeve is moved.

It is especially preferable for the enlargement of diameter to be substantially conical in form. Not only is a relatively gentle transition achieved by this, but tools of relatively simply construction can also be used which, for creation of the widened portion, moreover have the advantage that the application of force to the cylinder sleeve can be effected substantially uniformly throughout the entire expansion operation.

The enlargement is preferably effected at an angle of at most 30° to the centre line of the liner. This avoids undue dilatation of the rim of the cylinder sleeve. On the other hand, this ensures that as a result of the enlargement of diameter, sufficient holding force is produced to hold the cylinder sleeve securely in the cylinder bore.

It is also advantageous that the enlargement has an axial length in the range from 1 to 3 mm. This does not materially restrict the useful length of the cylinder sleeve. On the other hand, it ensures that the cylinder sleeve is secured in the cylinder bore over a length that is long enough for the necessary holding forces to be applied.

In the region of its enlargement of diameter, the cylinder sleeve preferably has substantially the same material thickness as elsewhere. Inconsistencies up to about 20% below and about 5% above are admissible, however. The expansion process, during which the material of the cylinder sleeve is expanded, reduces the thickness of the material, which corresponds approximately to the ratio of the normal diameter to the enlarged diameter. Through suitable shaping of the tool, however, simultaneously with the expansion a compression of the expanded end can take place, so that by this means there is again a slight increase in the material thickness. In many cases it is in fact possible for the expanded end to have the same material thickness as the rest of the cylinder sleeve.

The cylinder sleeve is preferably made of plastics material. Many plastics materials permit a relatively low-friction sliding of the piston. The use of plastics materials was previously not possible, or only possible with difficulty, because plastics liners could only be fixed with difficulty in the base member.

The plastics material is preferably fibre-reinforced. This provides a greater strength of the plastics material with the result that greater stress can be accommodated. Examples of plastics materials which may be considered for the cylinder sleeve are, in particular, materials from the group of high-strength thermoplastic plastics materials on the basis of polyaryl ether ketones, in particular polyether ether ketones, polyamides, polyacetals, polyaryl ethers, polyethylene terephthalates, polyphenylene sulphides, polysulphones, polyether sulphones, polyether imides, polyamide imides, polyacrylates, phenol resins, such as novolak resins, or similar substances, and as fillers, use can be made of glass, graphite, polytetrafluoroethylene or carbon, in particular in fibre form. When using such materials, it is likewise possible to use water as the hydraulic fluid.

BRIEF DESCRIPTION OF THE DRAWING

The invention is explained hereinafter with reference to two preferred embodiments in conjunction with the drawing, in which FIG. 1 shows a first embodiment and FIG. 2 shows a second embodiment during mounting.

DESCRIPTION OF EXAMPLES EMBODYING THE BEST MODE OF THE INVENTION

A base member 1, for example a cylinder block of a hydraulic piston machine, has a plurality of cylinder bores 2, one of which is illustrated. A cylinder sleeve 3 is inserted in the cylinder bore 2. The cylinder sleeve 3 consists of a plastics material, in particular a plastics material reinforced with glass fibre or carbon fibre. The base member 1 can consist of a metal, for example steel, or also of a plastics material.

The cylinder sleeve 3 has the same outer diameter virtually along its entire length. Only at a first end is a circumferential projection 4 provided, the outer diameter of which is larger than that of the cylinder sleeve 3. The projection 4 forms a flange 5 which can be caused to engage a bearing surface 6 of the base member after insertion of the cylinder sleeve 3 in the base member 1.

The cylinder sleeve 3 cannot then be pushed further into the base member 1. It could, however, be pulled out. To avoid this, the cylinder sleeve 3 is expanded at its other end, that is to say, it has a substantially conical enlargement 7 of its diameter. This enlargement of its diameter is gradual. It may, if desired, start with a sharp bend. It is created by expanding the cylinder sleeve 3 once the cylinder sleeve 3 has been inserted in the base member 1. During the expansion, the material of the cylinder sleeve 3 is dilated slightly. It can also additionally be compressed. The material thickness of the cylinder sleeve 3 in the region of the enlargement 7 of diameter corresponds therefore substantially to the material thickness of the rest of the cylinder sleeve 3. The expansion is effected at an angle α, which is at most 30°. The axial length 1 of the expansion is around 1.3 to 2 mm.

A heated tool 8, which has a first portion 9 having an outer diameter corresponding to the inner diameter of the cylinder sleeve 3, is used to carry out the expansion, which is illustrated in FIG. 2. The tool 8 furthermore has a second portion 10 which has a larger outer diameter than the first portion 9. Between the first portion 9 and the second portion 10 there is a transition 11 which is essentially conical in form, that is, its form corresponds to that of a portion of a conical surface.

If the tool 8 is introduced into the cylinder sleeve 3, it comes first of all with the lower end of the transition 11, that is to say, the end nearer the first portion 9, into contact with the end of the cylinder sleeve 3. Since the tool 8 is heated, that is to say, has an elevated temperature, heat is transferred to the end of the cylinder sleeve 3 to be expanded. The cylinder sleeve 3 heats up at this place to a temperature that is below the melting point of the material of the cylinder sleeve 3, but which has been selected to be high enough for the material of the cylinder sleeve 3 to be at least partially plastically deformable. By virtue of this heating, the material of the cylinder sleeve 3 is able to widen at this place, so that the tool 8 can be introduced deeper into the cylinder sleeve 3. The transition 11 expands the material of the cylinder sleeve 3, which leads to the desired diameter enlargement 7. The tool 8 is now introduced into the cylinder sleeve 3 until the end of the cylinder sleeve 3 to be expanded, that is, the diameter enlargement 7, lies completely against the inner surface of a substantially conical recess 12 which is provided in the base member 1. As it is being introduced, the tool 8 exerts radial forces on the end of the cylinder sleeve 3, which expand the cylinder sleeve 3 in that region, and simultaneously exerts axial forces, which cause this end of the cylinder sleeve 3 to engage with the base member 1. In this manner, the cylinder sleeve 3 is caused to lie at its expanded end against the base member 1 so that it is fixed not only in the radial direction but also in the axial direction.

If the tool 8 is then removed again, the cylinder sleeve 3 is able to cool down. Once it has cooled, the moulded state, that is, the diameter enlargement 7, is maintained and the cylinder sleeve 3 sits fixedly in the base member 1.

At the other end of the cylinder sleeve 3 there is provided, as in FIG. 1, a projection 4. This projection is, however, incorporated in a portion 13 of enlarged diameter of the cylinder bore 2. By this means, the cylinder sleeve 3 and the base member 1 end at one surface. This can be achieved, for example, in that the axial length of the projection 4 and the depth of the portion 13 are the same. Should there still be any differences in height after insertion of the cylinder sleeve 3 in the base member 1, these can be evened out by finishing, for example, by grinding.

Shaping the cylinder sleeve 3 to provide a projection at the end that is not to be expanded can, of course, be omitted if this end too is expanded. Expansion is then advantageously effected at the same time from both sides, so that additional fixing of the cylinder sleeve 3 in the base member 1 can be omitted.

What is claimed is:

1. A method for mounting a cylinder sleeve in a base member, including the steps of inserting the cylinder sleeve in the base member and enlarging the outer diameter of the inserted cylinder sleeve at one end by introducing a heated tool under pressure into said one end and exerting axial and radial forces on the cylinder sleeve, the cylinder sleeve being heated before the outer diameter is enlarged.

2. A method according to claim 1, in which the cylinder sleeve is heated only at the end to be expanded.

3. A method according to claim 2, in which the cylinder sleeve is expanded at its one end such that its inner diameter is increased beyond the inner diameter of remaining portions of the sleeve.

4. A method according to claim 1, in which the tool has a first portion corresponding to the inner diameter of the cylinder sleeve and a second portion of larger diameter, transition from the first to the second portion being substantially in the form of a portion of a conical surface.

5. A method according to claim 1, in which the cylinder sleeve is heated to a temperature below its melting point and above a value at which its material deforms plastically.

6. A method according to claim 1, in which the other end of the cylinder sleeve is pre-formed before insertion into the base member.

7. A method according to claim 6, in which, before insertion of the cylinder sleeve, the base member is shaped to correspond with the other end.

8. A method according to claim 7, in which an end face of the base member receiving the other end of the cylinder sleeve and the other end of the cylinder sleeve are in one plane.

9. A method according to claim 1, in which the cylinder sleeve is expanded at both ends.

10. A hydraulic machine with a base member in which at least one cylinder sleeve is arranged in a cylinder bore, and in which the cylinder bore has a gradual enlargement of diameter at at least one end and the cylinder sleeve has an enlargement of its outer diameter matched to the gradual enlargement of diameter, the enlargement of the diameter at said one end having been made by introducing a heated tool under pressure into said one end and exerting axial and radial forces on the cylinder sleeve.

11. A hydraulic machine according to claim 10, in which the enlargement of diameter is essentially conical in form.

12. A hydraulic machine according to claim 11, in which the enlargement is effected at an angle of at most 30° to a centre line of the sleeve.

13. A hydraulic machine according to claim 10, in which the enlargement has an axial length in the range from 1 to 3 mm.

14. A hydraulic machine according to claim 10, in which the region of its enlargement of diameter the cylinder sleeve has material thickness substantially the same as material thickness elsewhere in the sleeve.

15. A hydraulic machine according to claim 10, in which the cylinder sleeve is made of plastic material.

16. A hydraulic machine according to claim 15, in which the plastic material is fibre-reinforced.

* * * * *